United States Patent
Takeda et al.

(10) Patent No.: US 10,484,991 B2
(45) Date of Patent: Nov. 19, 2019

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/753,686

(22) PCT Filed: Aug. 19, 2016

(86) PCT No.: PCT/JP2016/074168
§ 371 (c)(1),
(2) Date: Feb. 20, 2018

(87) PCT Pub. No.: WO2017/033841
PCT Pub. Date: Mar. 2, 2017

(65) Prior Publication Data
US 2019/0013985 A1   Jan. 10, 2019

(30) Foreign Application Priority Data
Aug. 21, 2015   (JP) ................................. 2015-164238

(51) Int. Cl.
*H04W 72/04* (2009.01)
*H04W 56/00* (2009.01)
*H04W 28/02* (2009.01)

(52) U.S. Cl.
CPC ... *H04W 72/0453* (2013.01); *H04W 28/0215* (2013.01); *H04W 56/00* (2013.01);
(Continued)

(58) Field of Classification Search
CPC ............. H04W 56/0015; H04W 72/94; H04W 72/0453; H04W 72/048; H04W 28/0215
See application file for complete search history.

(56) References Cited

U.S. PATENT DOCUMENTS

2010/0260081 A1* 10/2010 Damnjanovic ....... H04L 5/0053
370/281
2013/0064119 A1*  3/2013 Montojo ........... H04W 36/0061
370/252
(Continued)

OTHER PUBLICATIONS

Source: Samsung Electronics; Title: pCR 45.820 Narrowband LTE; 3GPP TSG GERAN#67 GP-150690 Yinchuan, China, Aug. 10-Aug. 14, 2015 (Year: 2015).*
(Continued)

*Primary Examiner* — Gary Mui
(74) *Attorney, Agent, or Firm* — Osha Liang LLP

(57) ABSTRACT

The present invention is designed so that synchronization can be adequately established even when a band to use is limited to a narrow band than the minimum system bandwidth (1.4 MHz) that is supported in existing LTE. According to one aspect of the present invention, a user terminal, in which a band to use is limited to a narrower band than the minimum system bandwidth supported in an existing LTE (Long Term Evolution) system, has a receiving section that receives a signal that is divided into a plurality of periods and transmitted, in a predetermined narrow band that overlaps a frequency band in which an existing synchronization signal is transmitted, and a control section that performs a synchronization process by identifying the signal that is divided into the plurality of periods and transmitted as being a synchronization signal that is generated by using a predetermined sequence, wherein the signal that is transmitted in at least one period in the plurality of periods is a portion of the existing synchronization signal.

10 Claims, 11 Drawing Sheets

(52) U.S. Cl.
CPC ....... *H04W 56/0015* (2013.01); *H04W 72/04* (2013.01); *H04W 72/048* (2013.01)

(56) References Cited

U.S. PATENT DOCUMENTS

| | | | |
|---|---|---|---|
| 2013/0089067 A1* | 4/2013 | Ji | H04W 56/00 370/330 |
| 2013/0301491 A1* | 11/2013 | Bashar | H04W 4/70 370/280 |
| 2013/0322363 A1* | 12/2013 | Chen | H04W 72/042 370/329 |
| 2014/0169326 A1* | 6/2014 | Levanen | H04W 56/00 370/330 |
| 2014/0198772 A1* | 7/2014 | Baldemair | H04L 27/2655 370/335 |
| 2017/0034798 A1* | 2/2017 | Lin | H04L 5/001 |
| 2018/0213468 A1* | 7/2018 | Chatterjee | H04L 5/0053 |
| 2018/0241495 A1* | 8/2018 | Xue | H04J 11/00 |

OTHER PUBLICATIONS

Source: Samsung Electronics; Title: pCR 45.820 Narrowband LTE (revision of GP-150690); 3GPP TSG GERAN#67 GP-150846 Yinchuan, China, Aug. 10-Aug. 14, 2015 (Year: 2015).*
International Search Report issued in PCT/JP2016/074168 dated Sep. 20, 2016 (1 page).
Written Opinion of the International Searching Authority issued in PCT/JP2016/074168 dated Sep. 20, 2016 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Extended European Search Report issued in counterpart European Patent Application No. 16839188.6, dated Mar. 14, 2019 (8 pages).

* cited by examiner

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In addition, successor systems of LTE (referred to as, for example, "LTE-A" (LTE-Advanced), "FRA" (Future Radio Access), "5G" (5th generation mobile communication system) and so on) are also under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, 3GPP (3rd Generation Partnership Project) is promoting the standardization of MTC (Machine-Type Communication) for cellular systems for machine-to-machine communication, among all M2M technologies (see non-patent literature 2). MTC terminals (MTC UE (User Equipment)) are being studied for use in a wide range of fields such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, among all MTC terminals, low-cost MTC terminals (LC (Low-Cost) MTC UEs) that can be implemented in simple hardware structures have been increasingly in demand. For these LC-MTC UEs, a communication scheme to allow LTE communication in a very narrow band is under study (which may be referred to as, for example, "NB-LTE" (Narrow Band LTE), "NB cellular IoT" (Narrow Band cellular Internet of Things), "clean slate," and so on). UEs that communicate in NB-LTE may be referred to as, for example, "NB-LTE UEs," "NB-LTE MTC (Machine Type Communication) UEs," and so on.

NB-LTE UEs are under study as UEs having the functions to transmit/receive in a narrower band (for example, 200 kHz) than the minimum system bandwidth (1.4 MHz) that is supported in existing LTE. However, since NB-LTE UEs cannot receive existing LTE synchronization signals (SSs), there is a threat that synchronization may not be adequately established.

The present invention has been made in view of the above, and it is therefore an object of the present invention to provide a user terminal, a radio base station and a radio communication method, whereby synchronization can be established adequately even when a band to use is limited to a narrower band than the minimum system bandwidth (1.4 MHz) that is supported in existing LTE.

Solution to Problem

According to one aspect of the present invention, a user terminal, in which a band to use is limited to a narrower band than the minimum system bandwidth supported in an existing LTE (Long Term Evolution) system, has a receiving section that receives a signal that is divided into a plurality of periods and transmitted, in a predetermined narrow band that overlaps a frequency band in which an existing synchronization signal is transmitted, and a control section that performs a synchronization process by identifying the signal that is divided into the plurality of periods and transmitted as being a synchronization signal that is generated by using a predetermined sequence, and the signal that is transmitted in at least one period in the plurality of periods is a portion of the existing synchronization signal.

Advantageous Effects of Invention

According to the present invention, synchronization can be adequately established even when a band to use is limited to a narrow band than the minimum system bandwidth (1.4 MHz) that is supported in existing LTE.

DESCRIPTION OF EMBODIMENTS

Studies are in progress to simplify the hardware structures of NB-LTE UEs at the risk of lowering their processing capabilities. For example, studies are in progress to lower the peak rate, limit the transport block size, limit the resource blocks (also referred to as "RBs," "PRBs" (Physical Resource Blocks), and so on), and limit the RFs to receive, and so on, in NB-LTE UEs, in comparison to existing user terminals (LTE terminals).

Unlike existing UEs, in which a system band (for example, 20 MHz (100 PRBs), one component carrier, etc.) is configured to be the upper limit of a band for use, the upper limit of a band for use for NB-LTE UEs is limited to a predetermined narrow band (for example, 200 kHz, one PRB, etc.). Studies are in progress to run such band-limited NB-LTE UEs in LTE/LTE-A system bands, considering the relationship with existing UEs.

For example, LTE/LTE-A system bands may support frequency-multiplexing of band-limited NB-LTE UEs and band-unlimited existing UEs. Consequently, NB-LTE UEs may be seen as terminals, in which the maximum band they support is a partial narrow band in the minimum system band that is supported in existing LTE (for example, 1.4 MHz), or may be seen as terminals which have the functions for transmitting/receiving in a narrower band than the minimum system band (for example, 1.4 MHz) supported in LTE/LTE-A.

Figure 1:
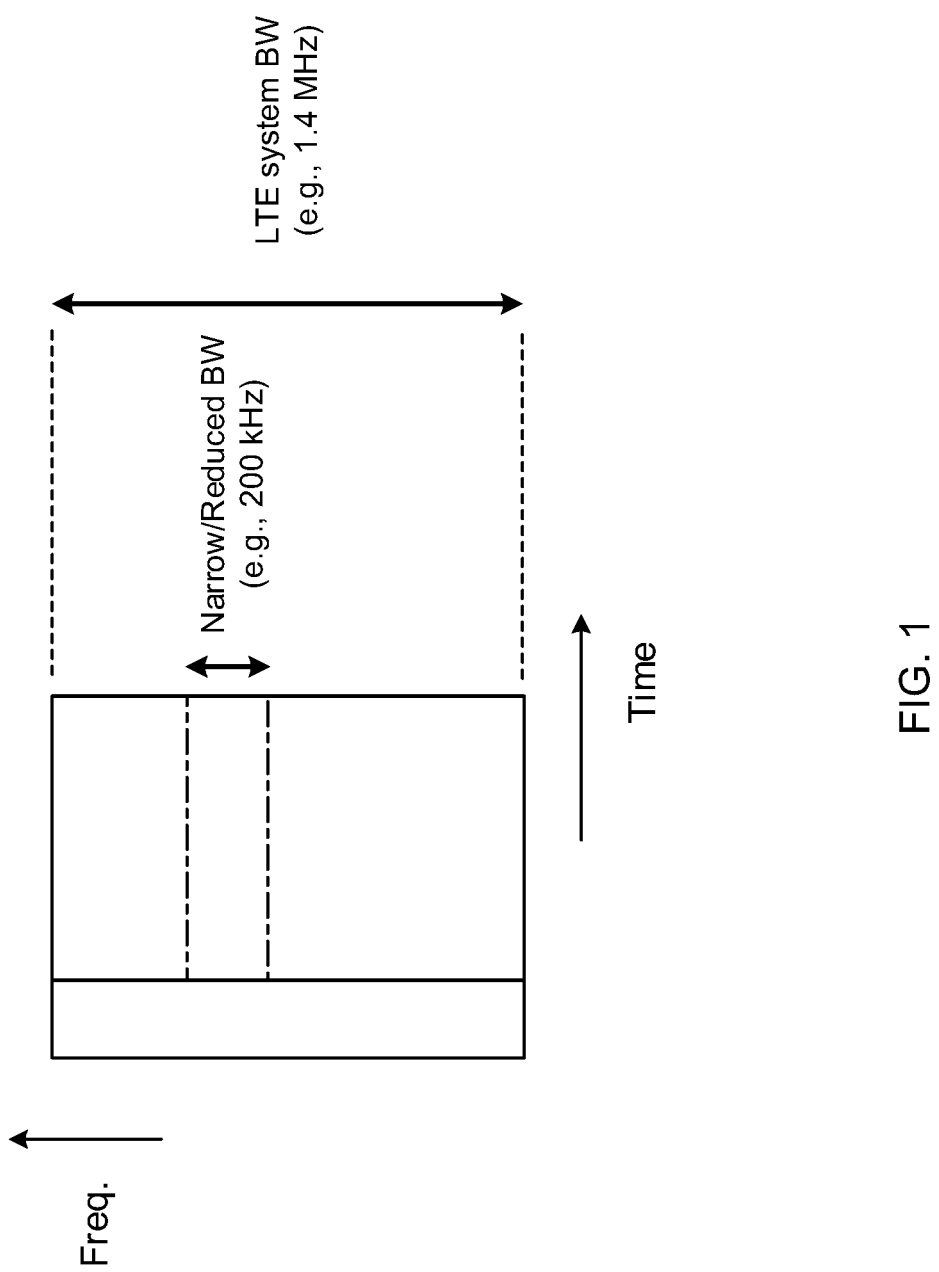
FIG. 1 is a diagram to show an example arrangement of a narrow band in a system band.

FIG. 1 is a diagram to show an example arrangement of a narrow band in a system band. In FIG. 1, a predetermined narrow band (for example, 200 kHz), which is narrower than LTE's minimum system band (for example, 1.4 MHz), is configured in a portion of a system band. This narrow band is a frequency band that can be detected by NB-LTE UEs.

Note that it is preferable to employ a structure, in which the frequency location of a narrow band that serves as a band for use by NB-LTE UEs can be changed within the system band. For example, NB-LTE UEs should preferably communicate by using different frequency resources per predetermined period (for example, per subframe). By this means, it is possible to achieve traffic offloading for NB-LTE UEs, achieve a frequency diversity effect, and reduce the decrease of spectral efficiency. Consequently, considering the application of frequency hopping, frequency scheduling and so on, NB-LTE UEs should preferably have an RF re-tuning function.

Note that different frequency bands may be used between the narrow band to use in downlink transmission/reception (DL NB: Downlink Narrow Band) and the narrow band to use in uplink transmission/reception (UL NB: Uplink Narrow Band). Also, the DL NBs may be referred to as the "downlink narrow band," and the UL NB may be referred to as the "uplink narrow band."

NB-LTE UEs receive downlink control information (DCI) by using a downlink control channel that is placed in a narrow band, and this downlink control channel may be referred to as an "EPDCCH" (Enhanced Physical Downlink Control CHannel), may be referred to as an "MPDCCH" (MTC PDCCH), or may be referred to as an "NB-PDCCH."

Also, NB-LTE UEs receive downlink data by using a downlink shared channel (downlink data channel) that is placed in a narrow band, and this downlink shared channel may be referred to as a "PDSCH" (Physical Downlink Shared CHannel), may be referred to as an "MPDSCH" (MTC PDSCH), or may be referred to as an "NB-PDSCH."

Also, an uplink control channel (for example, a PUCCH (Physical Uplink Control CHannel)) and an uplink shared channel (for example, a PUSCH (Physical Uplink Shared CHannel)) for NB-LTE UEs may be referred to as, respectively, an "MPUCCH" (MTC PUCCH) or an "NB-PUCCH," and an "MPUSCH" (MTC PUSCH) or an NB-PUSCH, and so on. The above channels are by no means limiting, and any channel that is used by NB-LTE UEs may be represented by affixing an "M," which stands for MTC, an "N," which stands for NB-LTE, or an "NB," to the existing channel used for the same purpose.

Also, it is possible to provide SIBs (System Information Blocks) for NB-LTE UEs, and these SIBs may be referred to as "MTC-SIBs," "NB-SIBs," and so on.

Now, in existing system (for example, LTE Rel. 10 to 12), synchronization, cell search and so on are conducted by using synchronization signals (PSS (Primary Synchronization Signal)/SSS (Secondary Synchronization Signal)).

The PSS and SSS are transmitted in subframes #0 and #5, using the central 6 PRBs of the carrier frequency. For example, in FDD, the PSS is transmitted in the last symbol (symbol #6) of the first slot in subframe #0 and subframe #5 (slots #0 and #10 in the radio frame). Also, the PSSs transmitted in these symbols are a common sequence.

Meanwhile, in FDD, for example, the SSS is transmitted in the symbol that is one symbol before the symbol in which the PSS is transmitted (symbol #5 of the first slot subframe #0 and subframe #5). Also, different SSS sequences are transmitted in subframe #0 and subframe #5. When an SSS is received, a UE can judge which sequence this is, identify the subframe in which this SSS is received (that is, identify the subframe index), and establish frame timing synchronization.

However, an NB-LTE UE, which supports only a narrower band (for example, 1 PRB) than LTE's minimum system band, can only receive a part of the bandwidth in which existing SSs (PSS/SSS) are transmitted (6 PRBs), and therefore cannot detect the SSs, and cannot complete cell search successfully.

So, the present inventors have come up with the idea of applying, to SSs, new mapping that is suitable for narrow bands that are very narrow (such as 1 PRB). To be more specific, the present inventors have found out a method of expanding SSs in the direction of time, while reducing the overhead of communication as much as possible.

Now, embodiments of the present invention will be described below. Although an NB-LTE UE that is limited to using a narrow band as a band for its use will be illustrated as an exemplary user terminal in each embodiment, the application of the present invention is by no means limited to NB-LTE UEs. Also, although a narrow band (NB) will be illustrated as being a band of 200 kHz or less (for example, 1 PRB), the present invention is applicable to other narrow bands as well, based on the present specification.

(Radio Communication Method)

According to one embodiment of the present invention, a radio base station (for example, an eNB (evolved Node B)) transmits a synchronization signal in a predetermined narrow band by dividing the synchronization signal into a plurality of periods. A UE sees (identifies) the signals transmitted in a plurality of periods, as a whole, as a synchronization signal, and performs synchronization processes. Here, the synchronization processes include establishing frequency synchronization with the eNB (for example, carrier frequency (center frequency) synchronization), establishing time synchronization (for example, subframe timing synchronization), acquiring a physical cell ID (PCID: Physical Cell Identity), RRM (Radio Resource Management) measure measurement, channel estimation and so on. When the synchronization processes are complete, the UE can finish the cell search and establish communication with the discovered eNB.

Figure 2B:
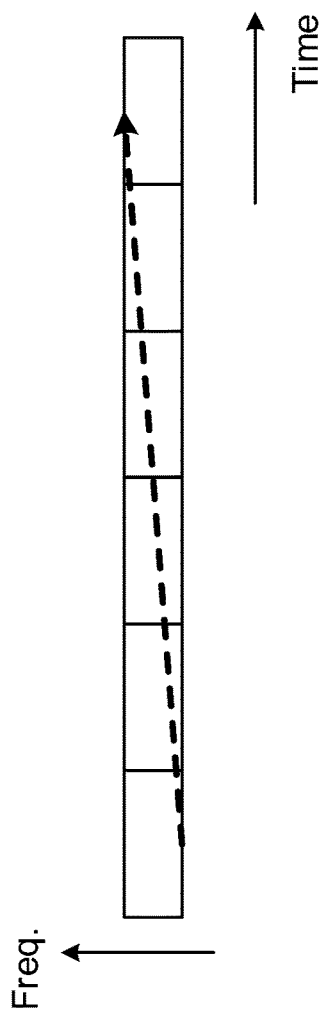
FIG. 2B is a conceptual diagram of the radio resource structure of synchronization signals according to one embodiment of the present invention.
Figure 2A:
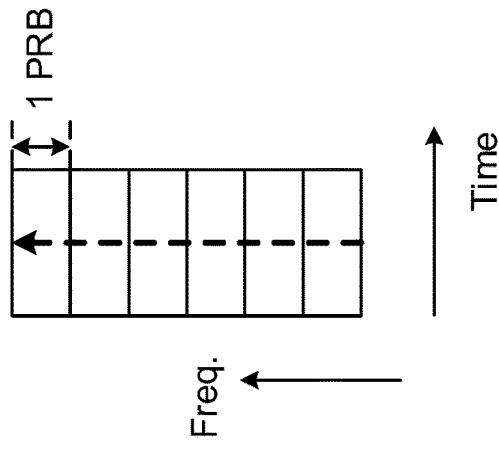
FIG. 2A is a conceptual diagram of the radio resource structure of existing synchronization signals.

FIG. 2 provide conceptual diagrams to show differences between the structures of an existing synchronization signal and a synchronization signal according to one embodiment of the present invention. FIG. 2A is a conceptual diagram of a radio resource structure of an existing synchronization signal. The existing synchronization signal is transmitted in one symbol, by using the central 6 PRBs of the carrier frequency (system band).

FIG. 2B is a conceptual diagram of a synchronization signal according to one embodiment of the present invention. With this synchronization signal, the signal sequences that constitute the synchronization signal, which have heretofore been frequency-multiplexed on a plurality of subcarriers, are divided into a plurality of periods and multiplexed in a predetermined narrow band (for example, 1 PRB). Note that the synchronization signal according to one embodiment of the present invention, which is transmitted over a plurality of periods as shown in FIG. 2B, may be referred to as "Rel. 13 SS," "Rel. 14 SS," "MSS (MTC SS)," "NB-SS" and so on. Furthermore, if these synchronization signals are equivalent signals to the existing PSS and SSS, these synchronization signals may be referred to as, for example, the "NB-PSS" and the "NB-SSS," respectively. Although the terms "NB-SSs" (NB-PSS/NB-SSS) will be used below, these are by no means limiting.

A plurality of periods in which an NB-SS is transmitted may be formed with, for example, TTIs (Transmission Time Interval), subframes, symbols and other arbitrary time units. Also, a plurality of periods in which an NB-SS is transmitted need not be a plurality of consecutive periods, and may be formed with a plurality of periods that are distant in time. Also, the length of each period constituting a plurality of periods may be the same or may be different.

<NB-SS Signal Sequences and Subcarrier Mapping>

First, the signal sequences and subcarrier mapping for existing SSs will be described. The existing PSS (the PSS of Rel. 8 to 12) is generated by using a Zadoff-Chu sequence of sequence length 62. Also, the existing SSS (the SSS of Rel. 8 to 12) is generate by using two binary sequences of sequence length 31, which are defined based on a plurality of sequences of sequence length 31.

Figure 3A:
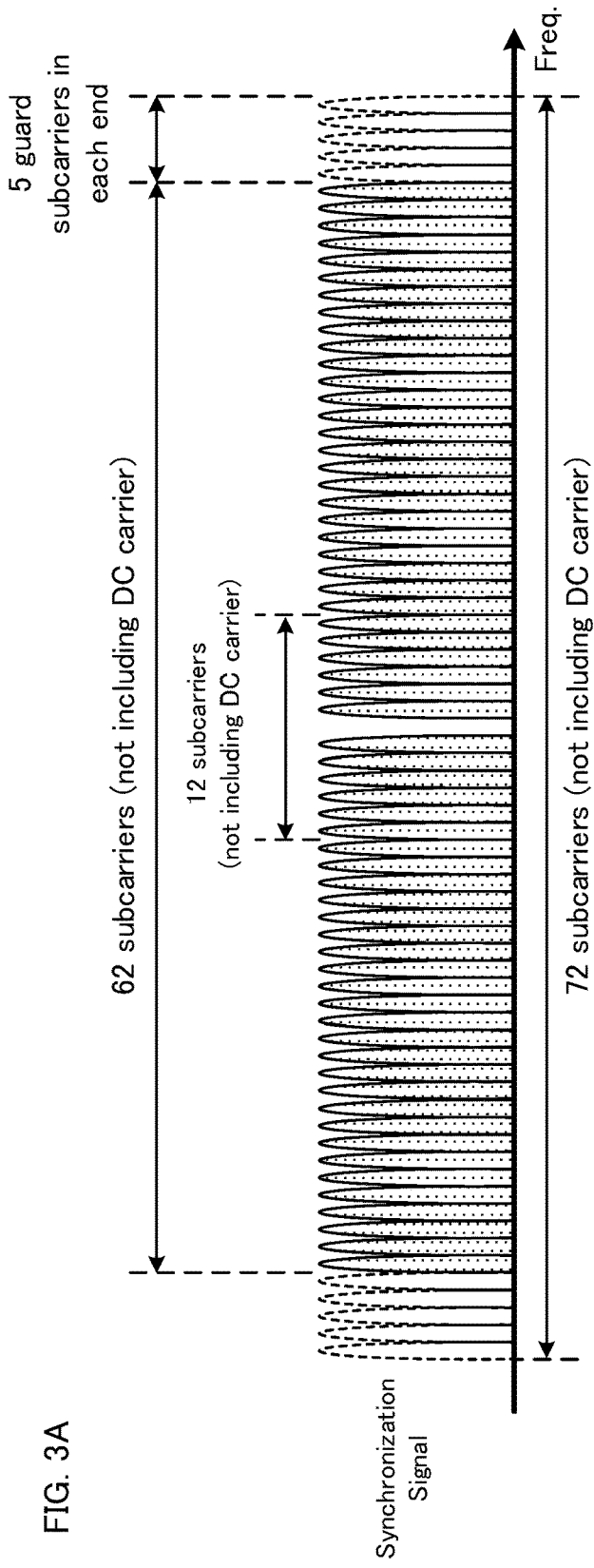
FIG. 3A is a diagram to show subcarriers where an existing SS is mapped.

FIG. 3 provide diagram to show subcarriers where an existing SS is mapped. In the existing SS, as shown in FIG. 3A, the signal sequence to constitute the SS is arranged in 62 subcarriers, not including the subcarrier in the center of the band (DC (Direct Current) subcarrier), and non-transmission subcarriers (guard subcarriers), which are five subcarriers wide, are arranged at both ends of these. By this means, the SS can be mapped to 6 PRBs (=72 subcarriers) of frequency resources.

Figure 3B:
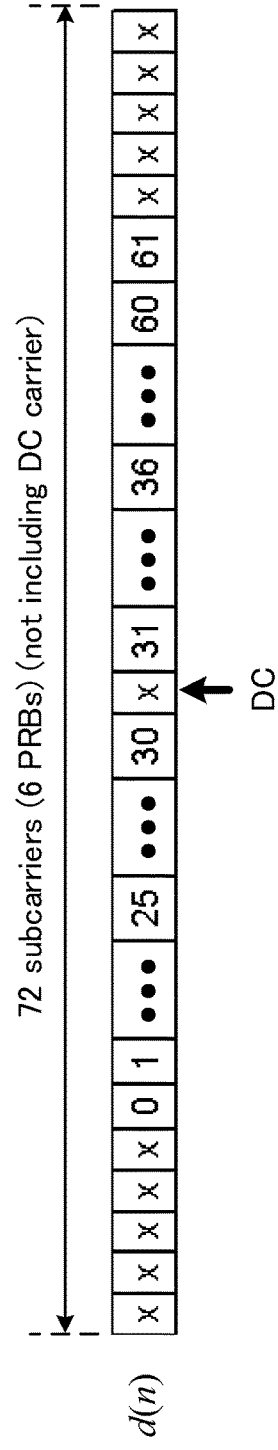
FIG. 3B is a schematic diagram to show the signal sequences d(n) of the SS transmitted in each subcarrier.

FIG. 3B is a schematic diagram to show the signal sequence d(n) of the SS, transmitted in each subcarrier. Here, n is the subcarrier index (ranging from 0 to 61). Also, in FIG. 3B, "x" stands for non-transmission subcarriers.

A radio base station generates an NB-SS using the same sequence as those of existing SSs. Here, although the NB-SS is divided into a plurality of periods and multiplexed on a predetermined narrow band, the NB-SS should preferably be mapped to overlap an existing SS in at least one period among the multiple periods. That is, the constituent part of the NB-SS transmitted in this one period is the same as a part of an existing SS (a part of an existing SS, mapped to this predetermined narrow band).

Figure 4A:
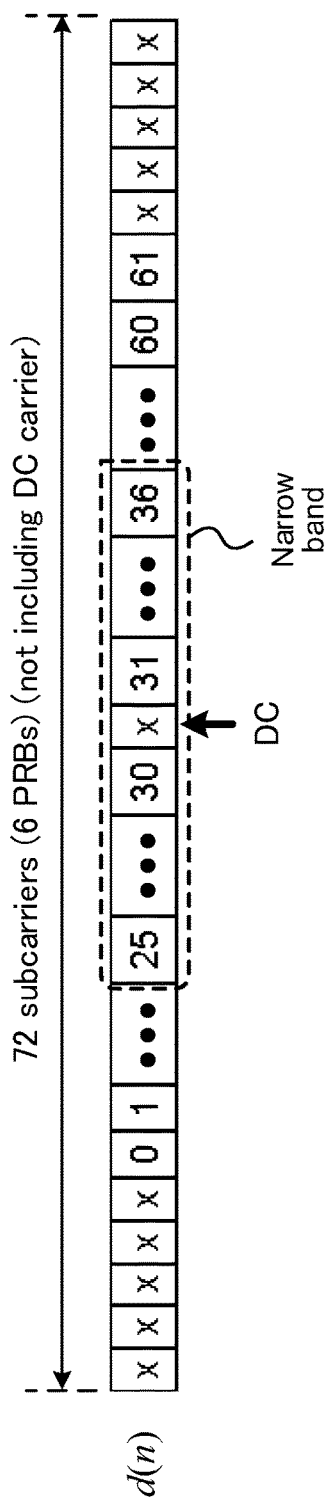
FIG. 4A is a diagram to show an example of an NB-SS that is mapped to overlap an existing SS.

FIG. 4 provide diagrams to show examples of NB-SS signal sequences d(n) that are transmitted in a predetermined narrow band. FIG. 4A is a diagram to show an example of an NB-SS that is mapped so as to overlap an existing SS. In this example, 13 subcarriers, including DC, is equivalent to a predetermined narrow band, and, a UE receives the sequence that corresponds to n=25-36 in the existing SS as a part to constitute the NB-SS.

Figure 4B:
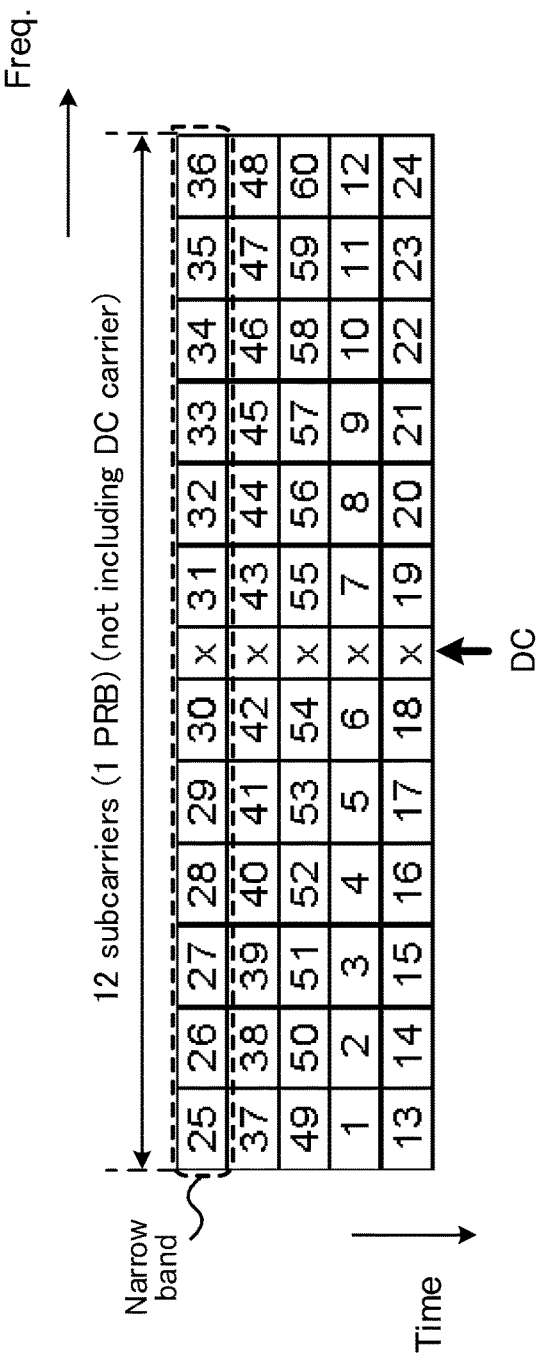
FIG. 4B shows the sequences that are transmitted as the NB-SS of FIG. 4A in a chronological representation.

FIG. 4B shows examples of sequences that are transmitted as the NB-SS of FIG. 4A, in a chronological representation. For example, when a narrow band is stipulated as being 1 PRB, it is possible to use a plurality of periods such as five periods (for example, 5 symbols), and transmit, for example, sequences that correspond to n=25-36, 37-48, 49-60, 1-12 and 13-24 in order. In this example, n=0 and 61 are not transmitted, and punctured. Note that the sequences that are not transmitted are not limited to the combination of n=0 and 61.

Note that, when the number of transmitting sequences decreases in this way, it may be possible to configure an NB-SS by puncturing sequences that are not transmitted, while maintaining the sequence length of the sequences that are used to generate the SS, or it may be possible to generate an NB-SS by using sequences that have a short sequence length in advance.

For example, while the existing PSS sequence can be represented by following equation 1, the sequence of equation 2 may be used for the NB-SS (NB-PSS).

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{(Equation 1)}$$

$$d_u(n) = \begin{cases} e^{-j\frac{\pi u n(n+1)}{63-X}} & n = X/2, X/2+1, \ldots, 30 \\ e^{-j\frac{\pi u(n+1)(n+2)}{63-X}} & n = 31, 32, \ldots, 61-X/2 \end{cases} \quad \text{(Equation 2)}$$

Here, X is the difference between the sequence length of the existing PSS and the sequence length of the NB-SS. For example, if X=2 holds in equation 2, n can assume the values of n=1 to 60. Note that the signal sequence of the NB-SS is not limited to equation 2.

Although the example of FIG. 4B illustrates a case where an SS is transmitted using five periods, the embodiments of the present invention are by no means limited to this. For example, it is possible to employ a structure in which all sequences n=0-61 are transmitted by using six periods. Also, it is equally possible to employ a structure in which a part of the sequences of n=0-61 are transmitted by using five or fewer periods.

Figure 5A:
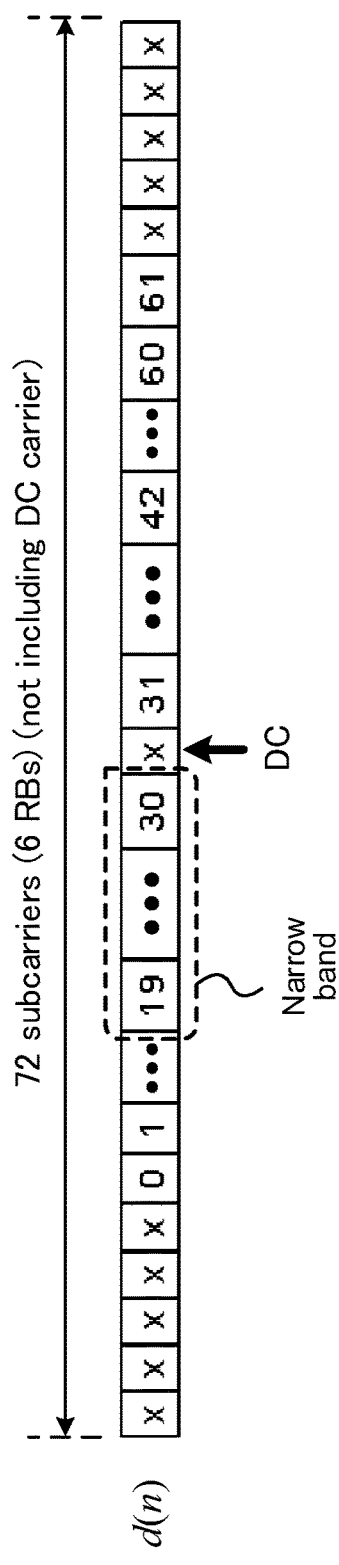
FIG. 5A is a diagram to show another example of an NB-SS that is mapped to overlap an existing SS.

FIG. 5 provide diagrams to show other examples of NB-SS signal sequences d(n) transmitted in a predetermined narrow band. FIG. 5A is a diagram to show another example of an NB-SS that is mapped so as to overlap an existing SS. In this example, the 12 subcarriers that do not overlap DC are equivalent to a predetermined narrow band, and a UE receives the sequence that corresponds to n=19-30 in the existing SS as a part to constitute the NB-SS.

Figure 5B:
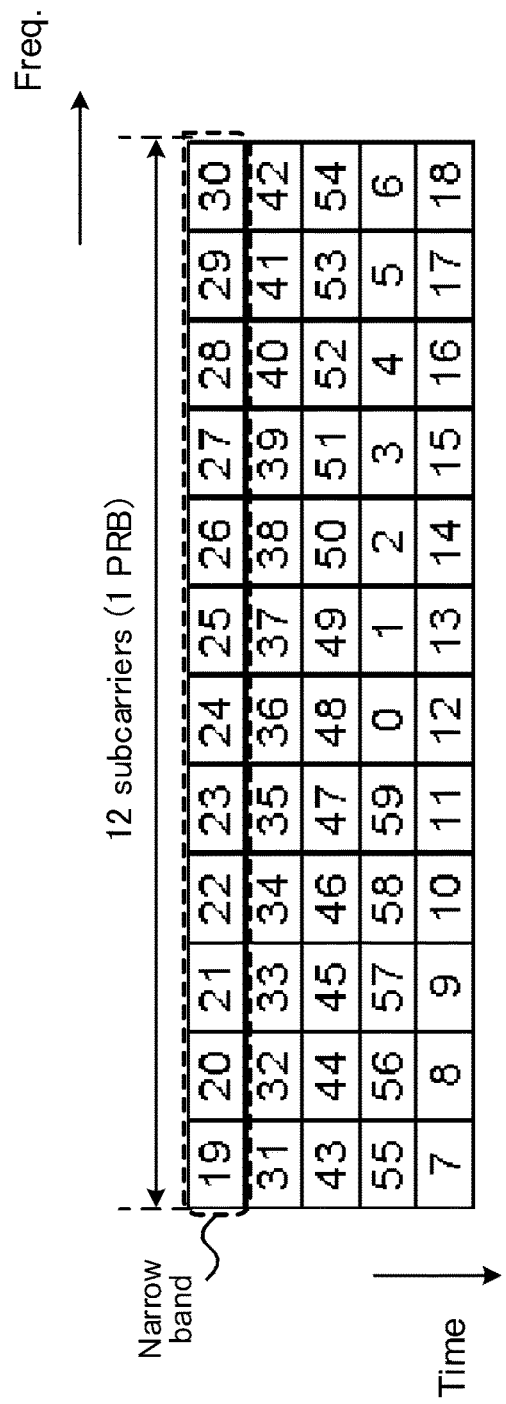
FIG. 5B shows the sequences that are transmitted as the NB-SS of FIG. 4A in a chronological representation.

FIG. 5B shows examples of sequences that are transmitted as the NB-SS of FIG. 5A, in a chronological representation. For example, when a narrow band is stipulated as being 1 PRB, it is possible to use a plurality of periods such as five periods (for example, 5 symbols), and transmit, for example, sequences that correspond to n=19-30, 31-42, 43-54, 55-59 and 0-6, and 7-18, in order. In this example, the sequences that correspond to n=60 and 61 are punctured, or a sequence of sequence length 60 is used. Note that the order of sequences that are transmitted as the NB-SS and the relationship between the sequences and subcarriers are not limited to the examples shown in FIG. 4 and FIG. 5.

Also, NB-SSs are not limited to the frequency locations shown as examples in FIG. 4 and FIG. 5. For example, NB-SSs may be mapped to subcarriers so as to overlap the channel raster. The "channel raster" here refers to the minimum configuration unit for use when determining the carrier's center frequency, and is, for example, spaced at multiples of the fundamental frequency (100 kHz) in LTE. According to this structure, NB-SSs are placed near the channel raster, so that it is possible to reduce the increase of the number of candidate narrow bands involved in cell search, and, furthermore, reduce the complexity of the UE's frequency synthesizer.

Furthermore, an NB-SS may be mapped to subcarriers so as to overlap one of the frequency locations that are spaced at intervals of the least common multiple (=900 kHz) of the channel raster (for example, 100 kHz) and the resource block size (for example, 12 subcarriers=180 kHz). According to this structure, it is possible to prevent the deployment of NB-SSs from interfering with the deployment of PRBs in existing systems (that is, a structure in which the frequency boundaries of PRBs and the frequency boundaries of NB-SSs match), so that it is possible to reduce the decrease of spectral efficiency.

The resource block size here can also be referred to as the minimum frequency resource scheduling unit. For example, when applying the present invention to a radio communication system in which the minimum scheduling unit defined is different from LTE's resource block size, an NB-SS may be allocated so as to overlap at least one of the frequency locations provided at intervals of the least common multiple of the channel raster and the minimum scheduling unit in this radio communication system.

As described above, according to one embodiment of the present invention, an NB-SS is generated in an eNB by using predetermined sequences, divided into a plurality of periods and transmitted in a predetermined NB. By this means, even NB-LTE UEs can achieve time time/frequency synchronization.

Furthermore, according to one embodiment of the present invention, an eNB transmits an NB-SS, which is divided into a plurality of periods, in an NB that overlaps frequency resources of an existing SS, so that a part of the NB-SS can be transmitted by using the existing SS. In this case, it is not necessary to reserve completely new radio resource for the NB-SS, so that it is possible to reduce the increase of communication overhead.

Note that, although a synchronization signal that is equivalent to the existing PSS has been described above as the NB-SS of the present embodiment, this is by no means limiting. For example, even when a synchronization signal that is equivalent to the existing SSS is provided as an NB-SS, the same techniques as those described above may be applied to the sequence generation and/or subcarrier mapping. In this case, the NB-SS sequence may be generated by, for example, correcting the parameters (m, s, c, etc.) used to generate the existing SSS sequence considering that the sequence length of the binary sequences changes from 31, by puncturing sequences, and so on.

<Resource Allocation for Each Signal>

Furthermore, the present inventors have found the problem that the spectral efficiency decreases when an NB-SS is transmitted in a narrow band that includes the DC subcarrier in the minimum system bandwidth (for example, 200 kHz around the center). This problem will be described with reference to FIG. 6.

Figure 6:
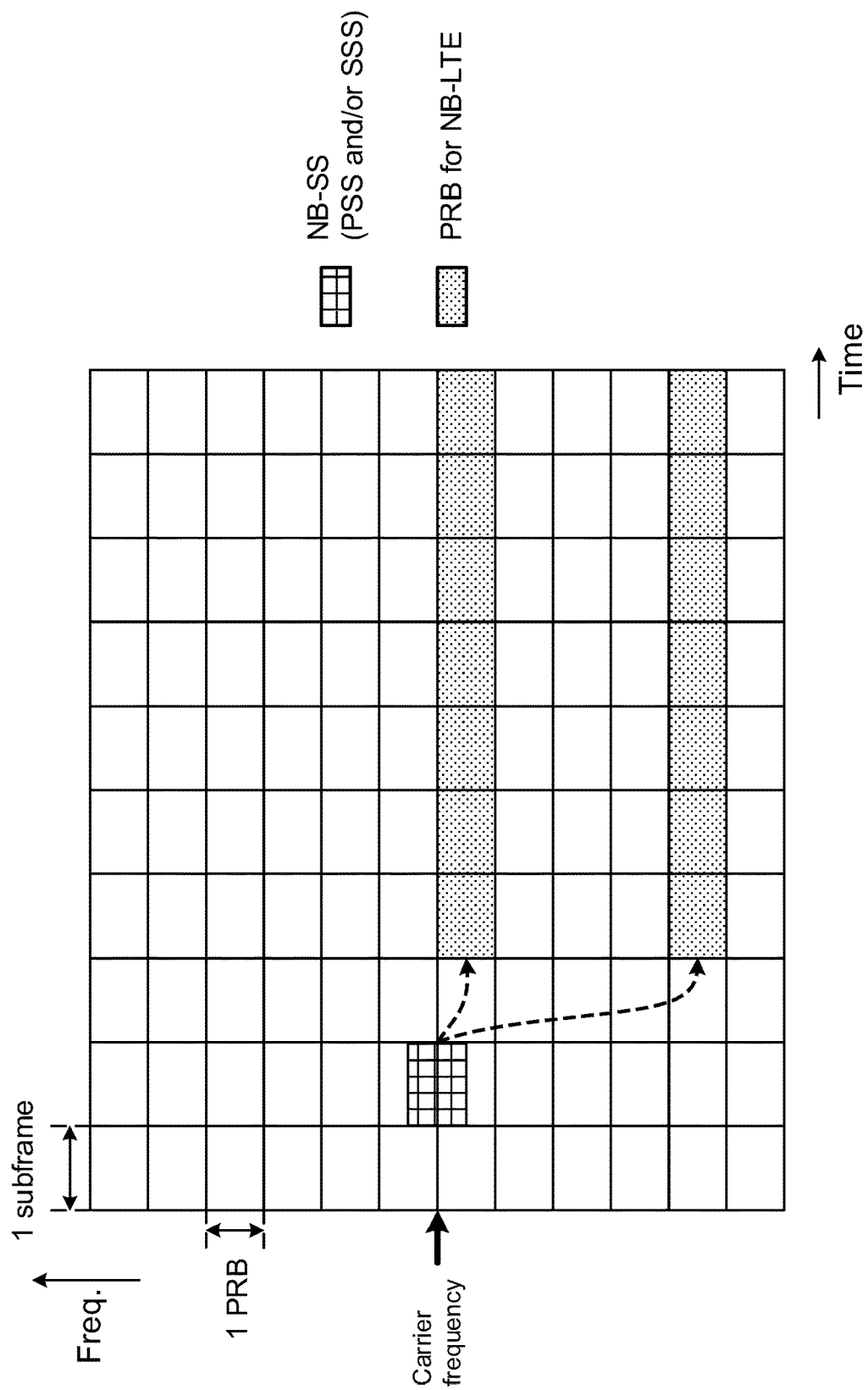
FIG. 6 is a diagram to show an example of radio resources for use in NB-LTE.

FIG. 6 is a diagram to show examples of radio resources for use in NB-LTE. In FIG. 6, an NB-SS (which is, for example, the NB-PSS/NB-SSS) is allocated to one predetermined subframe (which may also be, for example, multiple symbols in the subframe) in a narrow band (for example, 200 kHz) centered around the carrier frequency. Here, the narrow band is a band that is narrower than one PRB, but is placed over 2 PRBs in an existing LTE system.

When, in addition to the NB-SS, other signals are also allocated to this narrow band at the carrier frequency center, an eNB cannot schedule these 2 PRBs for other signals (for example, signals to allocate to normal LTE-UEs), and therefore the spectral efficiency decreases.

So, the present inventors have come up with the idea of avoiding, as much as possible, allocating a narrow band to the carrier frequency center. To be more specific, the present inventors have found out a structure in which, once a UE captures the carrier frequency, signals can be allocated in units of per PRB that is used in existing LTE.

For example, referring to FIG. 6, for the initial state, a UE configures a signal-monitoring NB at the carrier frequency center. Then, when the NB-PSS is detected in the narrow band (NB) at the carrier frequency center, frequency synchronization is complete. After that, the UE shifts the signal-monitoring NB from the center of the carrier frequency, configures this NB in a frequency location belonging to a predetermined PRB in existing LTE (PRB for NB-LTE).

For example, FIG. 6 shows, as examples of PRBs for NB-LTE, a PRB that adjoins the carrier frequency center and the PRB that is 4 PRBs apart from the carrier frequency center. In this way, a PRB for NB-LTE may be either a narrow band that is at least partly different from a narrow band where an NB-SS is allocated, or may be a completely different narrow band.

In PRBs for NB-LTE, an eNB may transmit NB-SSs (for example, the NB-SSS) or may transmit reference signals. For the reference signals, for example, the cell-specific reference signal (CRS: Cell-specific Reference Signal), the channel state information reference signal (CSI-RS: Channel State Information-Reference Signal), the demodulation reference signal (DMRS: DeModulation Reference Signal), and the positioning reference signal (PRS: Positioning Reference Signal) and so on may be transmitted. Note that the eNB may also transmit data, control signals and so on in PRBs for NB-LTE. The UE may receive at least one of these signals in PRBs for NB-LTE. Furthermore, the UE may transmit data, control signals, reference signals and so on in PRBs for NB-LTE.

Note that the UE may identify PRB for NB-LTE based on NB-SSs. For example, the UE may identify the frequency locations of PRBs for NB-LTE based on predetermined information acquired from the NB-PSS that is transmitted in the carrier frequency center (for example, cell ID groups (0 to 2)).

As described above, according to one embodiment of the present invention, an eNB exerts control so that only predetermined signals (for example, the NB-PSS) are transmitted in a narrow band that overlaps the carrier frequency center, and other signals (for example, the NB-SSS, the CRS, etc.) are transmitted in a narrow band that does not overlap the carrier frequency center (that do not bridge over the DC subcarrier). By this means, it is possible to reduce the decrease of spectral efficiency even when NB-LTE is applied.

<Variation>

Note that, although cases have been described above with each embodiment where the synchronization process is performed by using an NB-SS, the synchronization process may be performed using signals other than NB-SSs. For example, an eNB may transmit a signal that is given by multiplying a predetermined reference signal sequence (for example, at least one sequence of the CRS, the CSI-RS and the PRS) by a scrambling sequence that is associated with the cell ID. Also, a UE may judge synchronization by using this signal with an NB-SS. Such signals may be also referred to as "NB-SSs."

Furthermore, although cases have been described above with each embodiment assuming that a user terminal is an NB-LTE UE that is limited to using a narrow band as a band for its use, this by no means limiting. The present invention is equally applicable to, for example, normal LTE terminals (terminals that have the functions for transmitting/receiving in a wider band than the minimum system band supported in existing LTE (for example, 1.4 MHz)), based on the present specification. Also, the present invention is applicable to UEs that use communication schemes other than LTE. Furthermore, the present invention is applicable to cases where NB-SSs are transmitted in a band (for example, 10 subcarriers) that is narrower than one PRB.

Note that the radio communication methods of the above-described embodiments may be applied individually or may be applied in combination.

(Radio Communication System)

Now, the structure of the radio communication system according to an embodiment of the present invention will be described below. In this radio communication system, the radio communication methods according to the above-described embodiments of the present invention are employed. Here, although an NB-LTE UE will be shown as an example of a user terminal that is limited to using a narrow band as a band for its use, the present invention is by no means limited to this.

Figure 7:
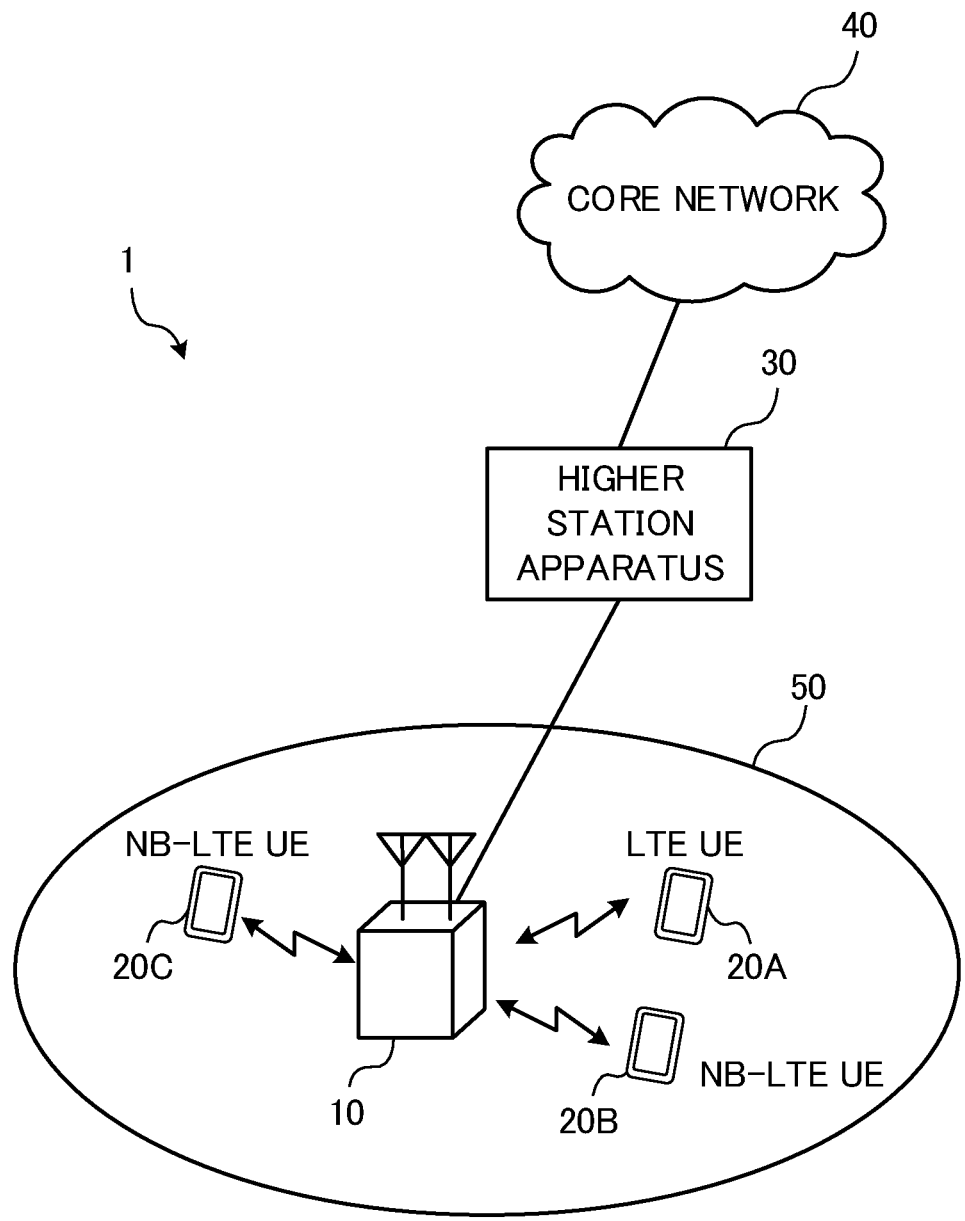
FIG. 7 is a diagram to show a schematic structure of a radio communication system according to an embodiment of the present invention.

FIG. 7 is a diagram to show a schematic structure of the radio communication system according to an embodiment of the present invention. The radio communication system 1 shown in FIG. 7 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system band is configured to range from minimum 1.4 MHz to maximum 20 MHz in both the downlink and the uplink, this configuration is by no means limiting.

Note that the radio communication system 1 may be referred to as "SUPER 3G," "LTE-A," (LTE-Advanced), "IMT-Advanced," "4G" (4th generation mobile communication system), "5G" (5th generation mobile communication system), "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminals 20 (20A to 20C) can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are NB-LTE UEs that serve as communication devices in machine communication systems. Hereinafter the user terminals 20A, 20B and 20C will be each simply referred to as a "user terminal 20," unless specified otherwise.

The NB-LTE UEs 20B and 20C are each a user terminal that is limited to using a narrower band than the minimum system bandwidth that is supported in existing LTE systems. Note that the NB-LTE UEs 20B and 20C may be terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals 20 directly, or communicate with other user terminals 20 via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPD- CCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Also, downlink radio quality information (CQI: Channel Quality Indicator), delivery acknowledgment information (ACKs/NACKs) and so on are communicated by the PUCCH. By means of the PRACH, random access preambles for establishing connections with cells are communicated.

Note that the channels for MTC terminals/NB-LTE UEs may be shown with an "M," which stands for MTC, or an "N," which stands for NB-LTE, and, for example, EPDCCH, PDSCH, PUCCH and PUSCH for MTC terminals/NB-LTE UEs may be referred to as "MPDCCH," "MPDSCH," "MPUCCH," and "MPUSCH," respectively.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

(Radio Base Station)

Figure 8:
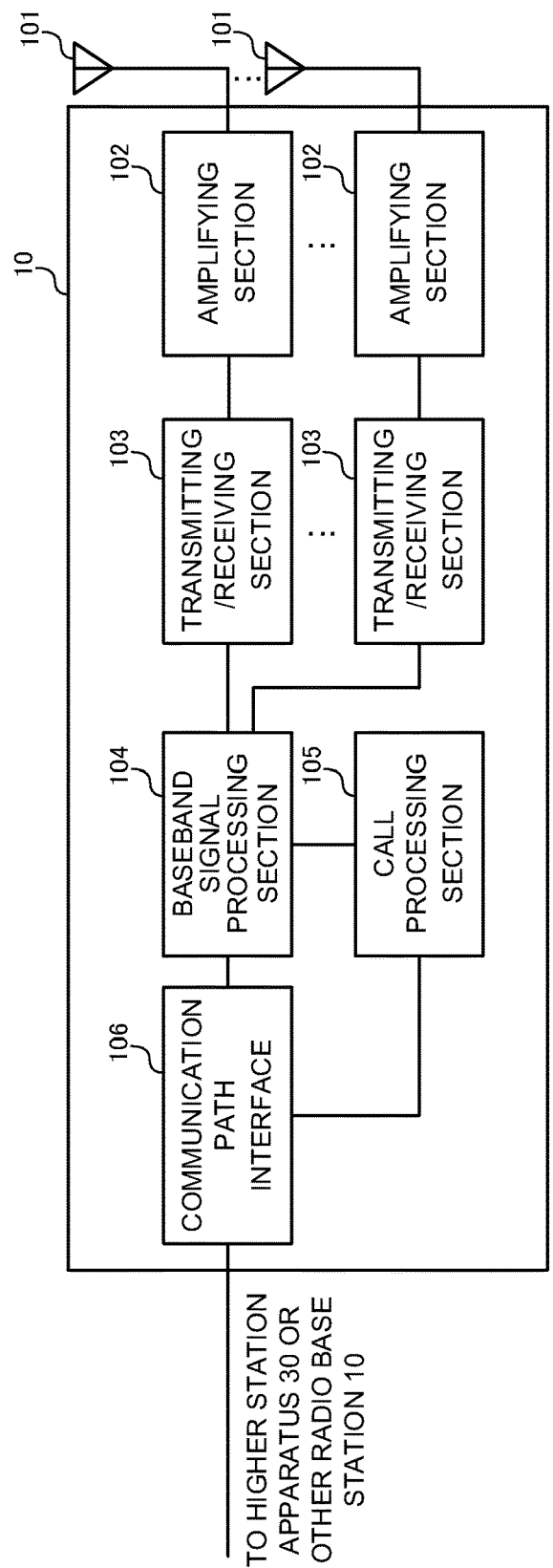
FIG. 8 is a diagram to show an example of an overall structure of a radio base station according to an embodiment of the present invention.

FIG. 8 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a narrow bandwidth (for example, 200 kHz) that is more limited than a system band (for example, one component carrier).

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface)m such as optical fiber, the X2 interface).

The transmitting/receiving sections 103 transmit NB-SSs, reference signals, control signals, data signals to a user terminal 20 and so on in a narrow band. Also, the transmitting/receiving sections 103 can receive reference signals, control signals, data signals and so on from the user terminal 20 in a narrow band.

Figure 9:
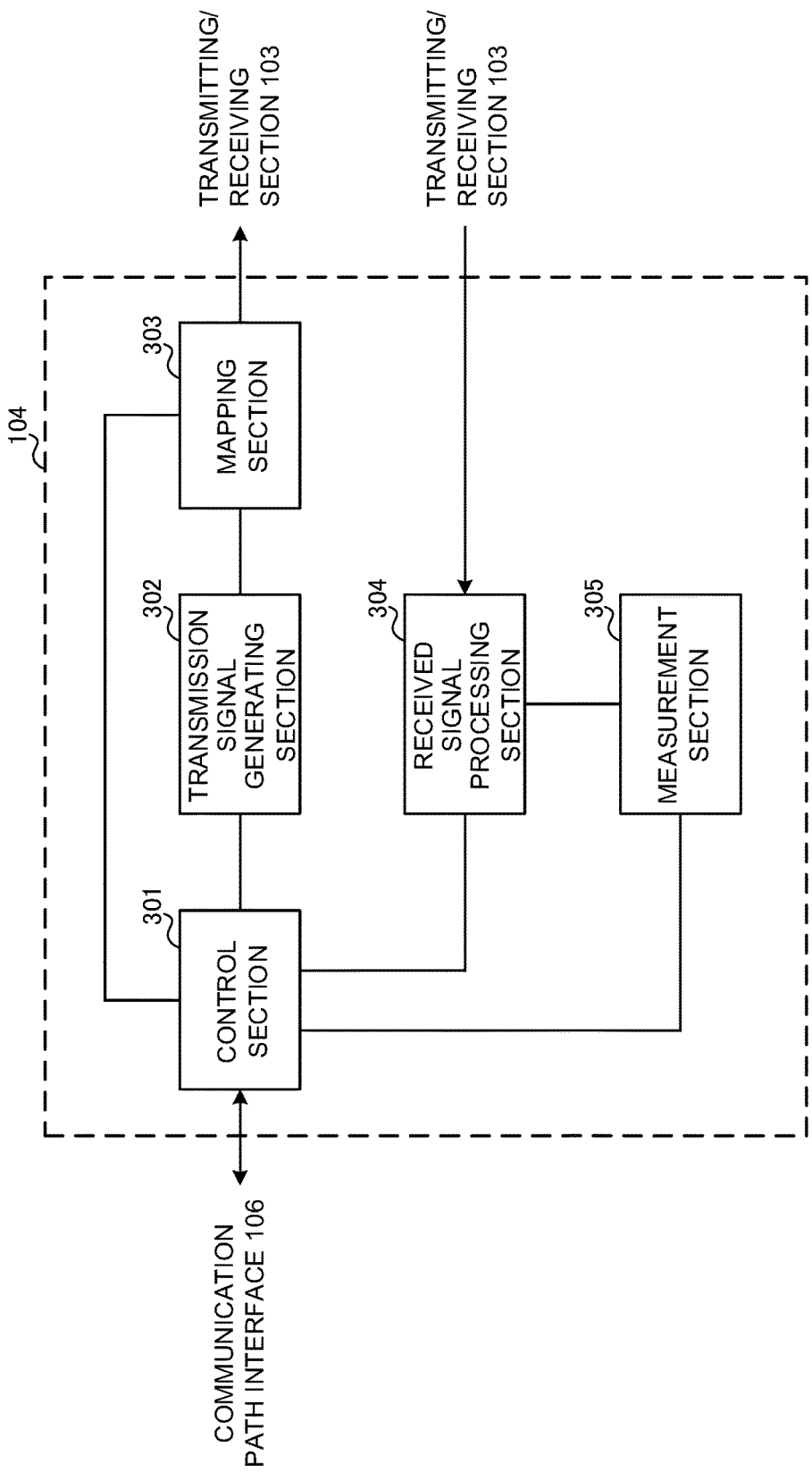
FIG. 9 is a diagram to show an example of a functional structure of a radio base station according to an embodiment of the present invention.

FIG. 9 is a diagram to show an example of a functional structure of a radio base station according to one embodiment of the present invention. Note that, although FIG. 9 primarily shows functional blocks that pertain to characteristic parts of the present embodiment, the radio base station 10 has other functional blocks that are necessary for radio communication as well. As shown in FIG. 9, the baseband signal processing section 104 has a control section (scheduler) 301, a transmission signal generating section (generation section) 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the MPDCCH. Also, the control section 301 controls the scheduling of synchronization signals (for example, the PSS (Primary Synchronization Signal)/SSS (Secondary Synchronization Signal), NB-SS, etc.), and downlink reference signals such as CRSs, CSI-RSs and DM-RSs.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 controls the transmission signal generating section 302 and the mapping section 303 to allocate various signals to a narrow band and transmit these to the user terminals 20. For example, the control section 301 controls downlink broadcast information (the MIB, SIBs (MTC-SIBs), etc.), the MPDCCH, the PDSCH and so on to be transmitted in a narrow band. This narrow band (NB) is a band (for example, 200 kHz) that is narrower than the minimum system bandwidth (1.4 MHz) supported in existing LTE systems.

Also, the control section 301 exerts control so that an NB-SS is generated by using predetermined sequences. For example, the control section 301 may exert control so that an NB-SS is generated by using sequences having a shorter sequence length than the sequences used to generate existing SSs. Furthermore, the control section 301 may exert control so that an NB-SS is formed with sequences that are given by partly puncturing signal sequences generated from the same sequences as those of existing SSs.

The control section 301 exerts control so that an NB-SS is divided into a plurality of periods (for example, symbols, subframes, etc.) and transmitted in a predetermined NB that overlaps a frequency band in which an existing SS is transmitted. The control section 301 may exert control so that an existing SS to include a divided portion of the NB-SS is transmitted in at least one of the multiple periods.

The control section 301 may exert control so that an NB-SS is allocated to a frequency location that overlaps the carrier frequency center (for example, the center frequency in the LTE system bandwidth), or allocated to a non-overlapping frequency location. Also, the control section 301 may exert control so that an NB-SS is allocated to frequency locations to overlap the channel raster of predetermined intervals (for example, intervals of integer multiples of 100 kHz).

Furthermore, the control section 301 may exert control so that an NB-SS is allocated to frequency locations provided at intervals of a common multiple (for example, 900 kHz) of the channel raster of predetermined intervals (for example, intervals of integer multiples of 100 kHz) and the frequency resource control unit in LTE (for example, the resource block size 180 kHz).

The control section 301 may exert control so that an NB-SS (the NB-PSS and/or the NB-SSS) is transmitted in a narrow band that overlaps the carrier frequency center, other signals (for example, the NB-SSS, CRSs, etc.) are transmitted in a narrow band that does not overlap the carrier frequency center (that does not bridge over the DC subcarrier). Here, the control section 301 may control the narrow band to transmit other signals in association with the NB-SS (for example, the NB-PSS).

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are selected based on channel state information (CSI) from each user terminal 20 and so on.

Furthermore, the transmission signal generating section 302 generates an NB-SS by using predetermined sequences based on a command from the control section 301.

The mapping section 303 maps the downlink signals generated in the transmission signal generating section 302 to predetermined narrow band radio resources (for example, maximum one resource blocks) based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

The received signal processing section 304 may measure the signal received power (for example, RSRP (Reference Signal Received Power)), the received quality (for example, RSRQ (Reference Signal Received Quality)), channel states and so on. The measurement results may be output to the control section 301.

(User Terminal)

Figure 10:
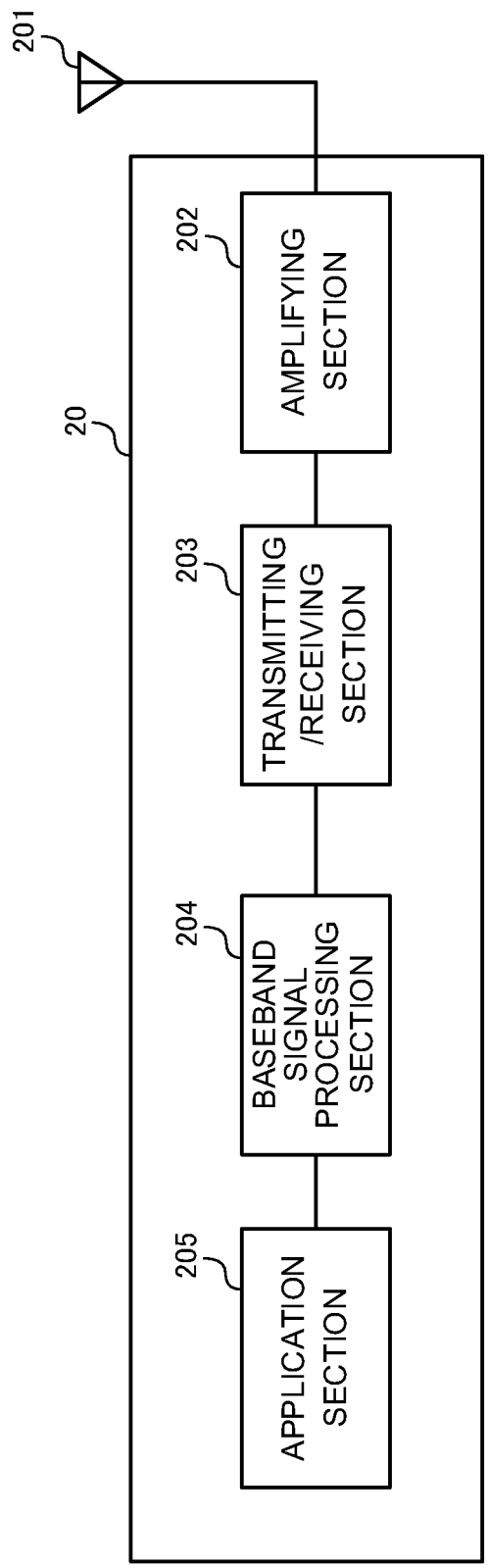
FIG. 10 is a diagram to show an example of an overall structure of a user terminal according to an embodiment of the present invention.

FIG. 10 is a diagram to show an example of an overall structure of a user terminal according to an embodiment of the present invention. Note that, although not described in detail herein, normal LTE terminals may operate to act as NB-LTE UEs. A user terminal 20 has a transmitting/receiving antenna 201, an amplifying section 202, a transmitting/receiving section 203, a baseband signal processing section 204 and an application section 205. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving section 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that the transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203.

The baseband signal that is output from the baseband signal processing section 204 is converted into a radio frequency bandwidth in the transmitting/receiving section 203. The radio frequency signal that is subjected to frequency conversion in the transmitting/receiving section 203 is amplified in the amplifying section 202, and transmitted from the transmitting/receiving antenna 201.

The transmitting/receiving section 203 receives NB-SSs, reference signals, control signals, data signals and so on from the radio base station 10 in a narrow band. Also, the transmitting/receiving section 203 transmits reference signals, control signals, data signals and so on to the radio base station 10 in a narrow band.

Figure 11:
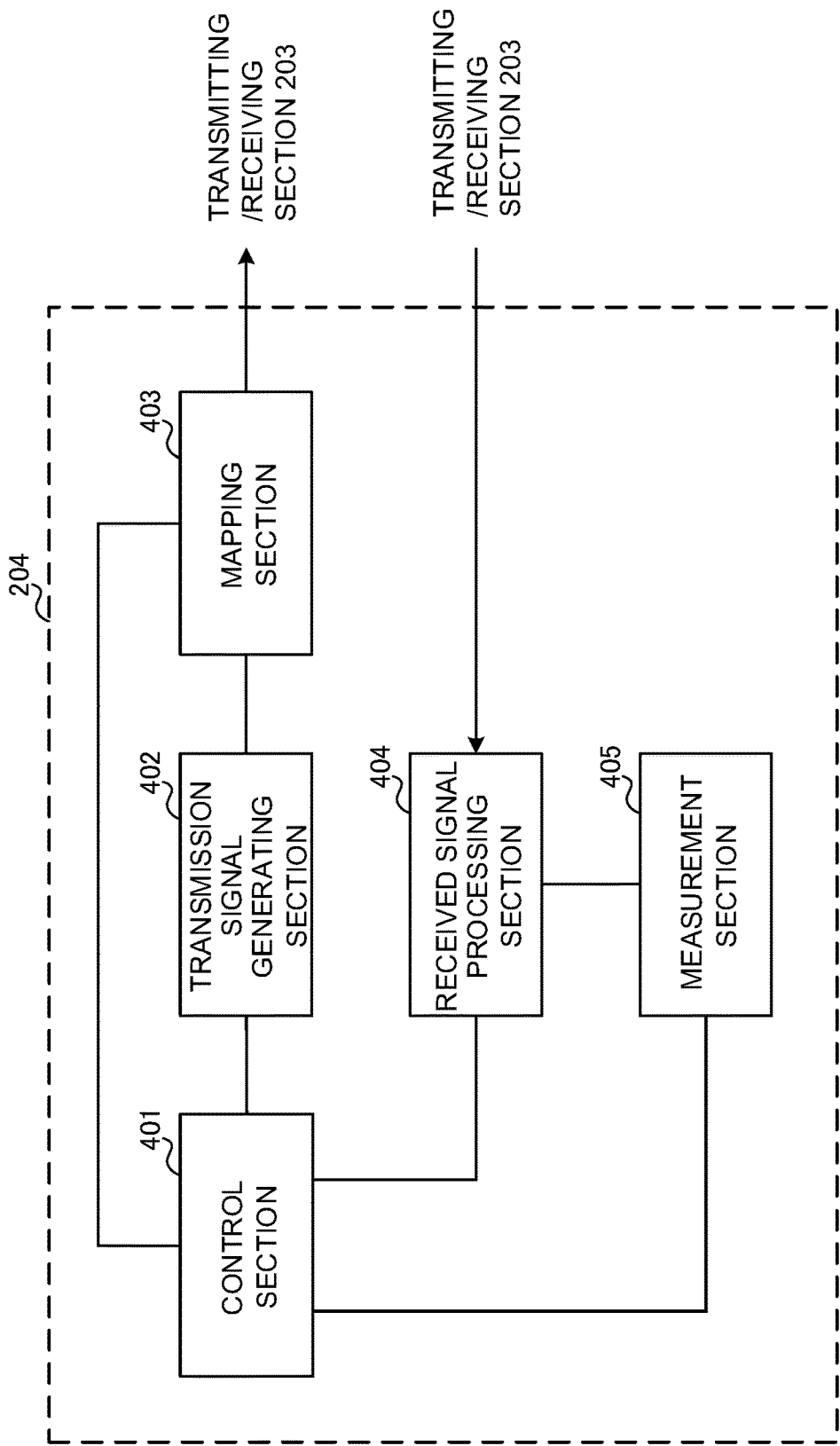
FIG. 11 is a diagram to show an example of a functional structure of a user terminal according to an embodiment of the present invention.

FIG. 11 is a diagram to show an example of a functional structure of a user terminal according to one embodiment of the present invention. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 has a control section 401, a transmission signal generating section (generation section) 402, a mapping section 403, a received signal processing section 404 and a measurement section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in PDCCH/MPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

Also, the control section 401 may exert control so that signals are received in a plurality of periods, these signals are identified as an SS (PSS/SSS) that is generated by using predetermined sequences, and synchronization processes are performed by using this SS. For example, the control section 401 may exert control so that, in a predetermined NB that overlaps a frequency band in which an existing SS is transmitted, an NB-SS is acquired based on signals received in a plurality of periods, and synchronization processes are performed based on this NB-SS.

The control section 401 may exert control so that NB-SS detection is tried in a frequency location that overlaps and/or that does not overlap the carrier frequency center. Also, the control section 401 may exert control so that NB-SS detection is tried in frequency locations to overlap the channel raster of predetermined intervals (for example, intervals of integer multiples of 100 kHz).

Furthermore, the control section 401 may exert control so that NB-SS detection is tried in frequency locations provided at intervals of a common multiple (for example, 900 kHz) of the channel raster of predetermined intervals (for example, intervals of integer multiples of 100 kHz) and the frequency resource control unit in LTE (for example, the resource block size 180 kHz).

Also, after the synchronization processes using an NB-SS are complete at least in part, the control section 401 may determine the narrow band for receiving other signals in association with the NB-SS (for example, the NB-PSS). For example, even when an NB-SS (the NB-PSS and/or the NB-SSS) is received in a narrow band that overlaps the carrier frequency center, the control section 401 may decide receiving other signals (for example, the NB-SSS, CRSs, etc.) in a narrow band that does not overlap the carrier frequency center (that does not bridge over the DC subcarrier).

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources (for example, maximum one resource blocks) based on commands from the control section 401, and outputs these to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, radio resources for transmitting/receiving a predetermined signal may be referred to as resources (or schemes) that are used to transmit/receive the predetermined signal, such as frequencies, time, codes and space. The transmission/receipt in this case may include receiving process (for example, demapping, demodulation, decoding, etc.)/transmission processes (for example, mapping, modulation, coding, etc.).

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-164238, filed on Aug. 21, 2015, including the specification, drawings and abstract, is incorporated herein by reference in its entirety.

The invention claimed is:

1. A user terminal, in which a band to use is limited to a narrower band than a minimum system bandwidth supported in an existing LTE (Long Term Evolution) system, the user terminal comprising:
   a receiving section that receives a signal that is divided into a plurality of periods and transmitted, in a predetermined narrow band that overlaps a frequency band in which an existing synchronization signal is transmitted; and
   a control section that performs a synchronization process by identifying the signal that is divided into the plurality of periods and transmitted as being a synchronization signal that is generated by using a predetermined sequence,
   wherein a signal that is transmitted in at least one period in the plurality of periods is a portion of the existing synchronization signal, the portion being mapped to the predetermined narrow band.

2. The user terminal according to claim 1, wherein a length of the predetermined sequence is shorter than a length of a sequence that is used to generate the existing synchronization signal.

3. The user terminal according to claim 1, wherein the predetermined sequence is a sequence that is given by puncturing the sequence that is used to generate the existing synchronization signal.

4. The user terminal according to claim 1, wherein, after the synchronization process in the control section is complete, the receiving section receives another synchronization signal and/or reference signal in a narrow band that is at least partly different from the predetermined narrow band.

5. The user terminal according to claim 4, wherein the receiving section identifies the narrow band that is at least partly different from the predetermined narrow band based on the synchronization signal that is generated by using the predetermined sequence.

6. The user terminal according to claim 1, wherein the predetermined narrow band does not overlap a center frequency of the minimum system bandwidth.

7. The user terminal according to claim 1, wherein the predetermined narrow band overlaps a channel raster of a predetermined interval.

8. The user terminal according to claim 7, wherein the predetermined narrow band overlaps one of frequency locations that are provided at intervals of a least common multiple of the channel raster of a 100-kHz interval and a resource block size of 180 kHz.

9. A radio base station that communicates with a user terminal, in which a band to use is limited to a narrower band than a minimum system bandwidth supported in an existing LTE (Long Term Evolution) system, the radio base station comprising:
   a generating section that generates a synchronization signal by using a predetermined sequence; and
   a transmission section that transmits the synchronization signal, by dividing the synchronization signal into a plurality of periods, in a predetermined narrow band that overlaps a frequency band in which an existing synchronization signal is transmitted,
   wherein the transmission section transmits the existing synchronization signal, which includes a divided portion of the synchronization signal, in at least one period in the plurality of periods, the portion being mapped to the predetermined narrow band.

10. A radio communication method for a user terminal, in which a band to use is limited to a narrower band than a minimum system bandwidth supported in an existing LTE (Long Term Evolution) system, the radio communication method comprising the steps of:
- receiving a signal that is divided into a plurality of periods and transmitted, in a predetermined narrow band that overlaps a frequency band in which an existing synchronization signal is transmitted; and
- performing a synchronization process by identifying the signal that is divided into the plurality of periods and transmitted as being a synchronization signal that is generated by using a predetermined sequence,
- wherein a signal that is transmitted in at least one period in the plurality of periods is a portion of the existing synchronization signal, the portion being mapped to the predetermined narrow band.

* * * * *